United States Patent
Koo et al.

(10) Patent No.: US 9,812,708 B2
(45) Date of Patent: Nov. 7, 2017

(54) CATHODE ACTIVE MATERIAL AND LITHIUM SECONDARY BATTERY COMPRISING SAME

(71) Applicant: LG Chem, Ltd., Seoul (KR)

(72) Inventors: Chang-Wan Koo, Daejeon (KR); Moon Kyu Cho, Seoul (KR); Joon Sung Bae, Daejeon (KR); Jae Bin Chung, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 14/353,173

(22) PCT Filed: Dec. 17, 2012

(86) PCT No.: PCT/KR2012/010977
§ 371 (c)(1),
(2) Date: Apr. 21, 2014

(87) PCT Pub. No.: WO2013/094942
PCT Pub. Date: Jun. 27, 2013

(65) Prior Publication Data
US 2015/0017529 A1  Jan. 15, 2015

(30) Foreign Application Priority Data
Dec. 22, 2011  (KR) .................. 10-2011-0140175

(51) Int. Cl.
| | |
|---|---|
| *H01M 4/62* | (2006.01) |
| *H01M 4/36* | (2006.01) |
| *H01M 4/505* | (2010.01) |
| *H01M 4/525* | (2010.01) |
| *H01M 4/131* | (2010.01) |
| *H01M 4/485* | (2010.01) |
| *H01M 4/50* | (2010.01) |
| *H01M 4/52* | (2010.01) |
| *H01M 4/60* | (2006.01) |
| *H01M 10/0525* | (2010.01) |
| *H01M 10/052* | (2010.01) |
| *H01M 4/02* | (2006.01) |

(52) U.S. Cl.
CPC ........... *H01M 4/366* (2013.01); *H01M 4/131* (2013.01); *H01M 4/485* (2013.01); *H01M 4/502* (2013.01); *H01M 4/505* (2013.01); *H01M 4/523* (2013.01); *H01M 4/525* (2013.01); *H01M 4/60* (2013.01); *H01M 4/622* (2013.01); *H01M 10/0525* (2013.01); *H01M 10/052* (2013.01); *H01M 2004/028* (2013.01)

(58) Field of Classification Search
None
See application file for complete search history.

(56) References Cited

U.S. PATENT DOCUMENTS

| | | | |
|---|---|---|---|
| 2009/0317718 A1* | 12/2009 | Imachi | H01M 4/13 429/212 |
| 2010/0119947 A1 | 5/2010 | Lee et al. | |
| 2010/0227221 A1 | 9/2010 | Chang et al. | |
| 2010/0297510 A1 | 11/2010 | Kim et al. | |
| 2012/0231337 A1* | 9/2012 | Miyata | C08J 3/05 429/217 |

FOREIGN PATENT DOCUMENTS

| | | | | |
|---|---|---|---|---|
| JP | 2001291519 A | 10/2001 | | |
| JP | 2003157847 A | 5/2003 | | |
| JP | 2007-234277 A | 9/2007 | | |
| JP | 2009064564 A | 3/2009 | | |
| JP | 2009526735 A | 7/2009 | | |
| JP | 2011003511 A | 1/2011 | | |
| JP | 2011076981 A | 4/2011 | | |
| JP | 5480911 B2 | 4/2014 | | |
| KR | 20070018303 A | 2/2007 | | |
| KR | 20100053758 A | 5/2010 | | |
| WO | 2010058993 A2 | 5/2010 | | |
| WO | WO2010/124570 A1 * | 11/2010 | ............ | H01M 10/05 |
| WO | 2011/019493 A1 | 2/2011 | | |
| WO | 2011/062232 A1 | 5/2011 | | |

OTHER PUBLICATIONS

Cellogen-Sodium Carboxymethyl Cellulose product pamphlet, printed Jan. 9, 2016 from http://www.harke.com/fileadmin/images/chemicals/Dai_Ichi_Cellogen.pdf.*
Li, Chia-Chen, et al., "Binder Distributions in Water-Based and Organic-Baed LiCoO2 Electrode Sheets and Their Effects on Cell Performance," Journal of the Electrochemical Society 158 (12) A 1361-A1370 (2011).
International Search Report for PCT/KR2012/010977 dated Mar. 15, 2013.
Daicel Finechem Ltd.: "Daicel FineChem Ltd. | CMC (Sodium Carboxymethyl Cellulose)", XP055216700. Document retrieved from the Internet: URL: http://www.daicelfinechem.jp/en/business/wspdiv/cmc.html.

* cited by examiner

*Primary Examiner* — Maria J Laios
(74) *Attorney, Agent, or Firm* — Lerner, David, Littenberg, Krumholz & Mentlik, LLP

(57) ABSTRACT

Disclosed is a cathode active material for secondary batteries in which a carboxymethyl cellulose derivative is coated on surfaces of particles of a lithium transition metal oxide having the formula $Li_xM_yO_2$ where M: $Ni_aMn_bCo_c$ wherein $0 \leq a \leq 0.9$, $0 \leq b \leq 0.9$, $0 \leq c \leq 0.5$, and $0.85 \leq a+b+c \leq 1.05$ and $x+y=2$, wherein $0.95 \leq x \leq 1.15$.

7 Claims, 4 Drawing Sheets

CATHODE ACTIVE MATERIAL AND LITHIUM SECONDARY BATTERY COMPRISING SAME

CROSS-REFERENCE TO RELATED APPLICATIONS

The present application is a National Phase Entry under 35 U.S.C §371 of International Application No. PCT/KR2012/010977, filed Dec. 17, 2012, which claims the benefit of Korean Patent Application No. KR 10-2011-0140175, filed Dec. 22, 2011 the disclosures of which are incorporated herein by reference in their entirety.

TECHNICAL FIELD

The present invention relates to a cathode active material and a lithium secondary battery including the same. More specifically, the present invention relates to a cathode active material for secondary batteries in which a carboxymethyl cellulose derivative is coated on surfaces of particles of a PREDETERMINED lithium transition metal oxide and a lithium secondary battery including the same.

BACKGROUND ART

Recently, portable electronic devices such as portable computers, portable telephones, camcorders, and the like have been continuously developed towards smaller and lighter devices. In line with such trend, secondary batteries used as a power source of these electronic devices require high capacity, small size, and light weight. Thereamong, research on lithium ion secondary batteries is actively conducted due to excellent characteristics thereof such as high voltage, long lifespan, high energy density, and the like and such lithium ion secondary batteries are produced and commercially available.

As a conventional cathode active material of a lithium secondary battery, a lithium-containing cobalt oxide (LiCoO$_2$) is mainly used. In addition, use of lithium-containing manganese oxides such as LiMnO$_2$ having a layered crystal structure, LiMn$_2$O$_4$ having a spinel crystal structure, and the like, and lithium-containing nickel oxides such as LiNiO$_2$ is also considered.

In this regard, charging and discharging are performed while lithium ions are intercalated into and deintercalated from a cathode active material. Although there are differences in theoretical capacities of batteries according to kinds of cathode active materials, in most cases, charge and discharge capacities are deteriorated as cycles proceed. Such phenomenon is mainly attributed to non-functioning of a cathode active material due to change in volume of a cathode occurring as charging and discharging of a battery proceed, such as separation of cathode active material components or separation between the cathode active material and a current collector, elution of metals, and the like.

In addition, polyvinylidene fluoride (PVdF), which is a polymer resin, is widely used as a binder. However, when moisture permeates an electrode, PVdF forms HF and, accordingly, a metal layer of a cathode is decomposed, which results in deteriorated battery performance.

To address this problem, a method of using, as water-based binders, rubber-based latexes such as styrene-butadiene rubber (SBR) is taken into consideration. SBR is environmentally friendly and enhances capacity and initial charge and discharge efficiency of secondary batteries when used in a reduced amount. Even in this case, however, while adhesion sustainability of SBR is enhanced due to elasticity of rubber, adhesion effects are low. Thus, SBR is not suitable for high-capacity active materials, which require an electrode with high adhesion because volumetric expansion is large when metal-based active materials are subjected to charging and discharging and thus use thereof is restricted.

To simultaneously address these problems, the related art proposes a method of coating a surface of a cathode active material with a predetermined material or a technology of surface-treating a cathode active material. However, cathode active materials that can fundamentally address the problems described above have not been developed yet.

Therefore, there is an urgent need to develop an electrode material that may enhance battery performance such that separation of cathode active material components or separation between a cathode active material and a current collector is prevented, volume expansion of a cathode active material occurring during repeated charging and discharging is controlled, adhesion is enhanced, and side reaction in the vicinity of a cathode is suppressed.

DISCLOSURE

Technical Problem

The present invention aims to address the aforementioned problems of the related art and to achieve technical goals that have long been sought.

As a result of a variety of intensive studies and various experiments, the inventors of the present invention confirmed that, as described below, when a cathode active material is coated with a carboxymethyl cellulose derivative, the carboxymethyl cellulose derivative serves as a thickening agent, facilitates dispersion of the cathode active material, and forms a film at a cathode surface and thus prevent elution of metals, which results in enhanced high-voltage and high-temperature performance, thus completing the present invention.

Technical Solution

In accordance with one aspect of the present invention, provided is a cathode active material for lithium secondary batteries, in which a carboxymethyl cellulose derivative is coated on surfaces of particles of a lithium transition metal oxide represented by Formula 1 below:

$$Li_xM_yO_2 \qquad (1).$$

In Formula 1,

M is Ni$_a$Mn$_b$Co$_c$ where 0≤a≤0.9, 0≤b≤0.9, 0≤c≤0.5, and 0.85≤a+b+c≤1.05, and x+y=2, wherein 0.95≤x≤1.15.

In the cathode active material according to the present invention, since a carboxymethyl cellulose derivative is coated on surfaces of particles of a lithium transition metal oxide, adhesion between cathode active material components and adhesion between the cathode active material and a current collector may be enhanced, the cathode active material may be readily dispersed in a cathode mixture, and a film may be formed at a surface of a cathode, thereby suppressing elution of a metal.

As defined in Formula 1 above, the lithium transition metal oxide is an oxide containing at least one transition metal selected from among Ni, Mn, and Co and may be a lithium transition metal oxide that contains all the transition metals and satisfies the conditions: 0.2≤a≤0.7, 0≤b≤0.5, and 0<c≤0.5.

In some cases, in Formula 1, M may be substituted with at least one element selected from the group consisting of Al, Mg, Fe, Ti, V, Zr, Sn, and Zn. In this case, a substitution amount of M may be 0.01 mol % to 30 mol %, preferably 0.1 mol % to 10 mol %, based on the total amount of transition metal elements.

Carboxymethyl cellulose is a material, some of three OH groups of a repeating unit of cellulose of which are substituted with a carboxymethyl group ($CH_2CO_2H$). In the present invention, carboxymethyl cellulose is a material, at least some of such carboxymethyl groups of which are substituted with other substituents.

In an exemplary embodiment, the carboxymethyl cellulose derivative may be a material represented by Formula 2 below:

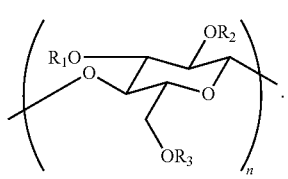

(2)

In Formula 2 above,

At least one selected from the group consisting of $R_1$, $R_2$, and $R_3$ is $CH_2CO_2X$ and the remaining group is $CH_2CO_2H$ or OH, wherein X is an alkali metal element, an alkali earth metal element, or $C_1$-$C_5$ alkyl;

n is an integer of 1 or more and determined within a range within which the carboxymethyl cellulose derivative has a weight average molecular weight Mw of 500,000 to 2,500,000, particularly 1,000,000 to 2,300,000. When the weight average molecular weight Mw of the carboxymethyl cellulose derivative is too great or too small, electrode adhesion may be significantly reduced or increased and, ultimately, lifespan characteristics of a battery may be deteriorated.

A rate (degree of substitution) to which $R_1$, $R_2$, and $R_3$ are $CH_2CO_2X$ is related to acidity (pH). Under conditions for which desired effects are appropriately achieved, a rate of $CH_2CO_2X$ may be 0.8 to 1.2, and the acidity of the carboxymethyl cellulose derivative may be pH 6.8 to pH 8.0.

As defined above, X may be selected from among an alkali metal element such as Na, K, Ca, Mg, or the like, an alkali earth metal element, and a lower alkyl such as methyl, ethyl, propyl, or the like and, preferably, may be Na. Thereamong, an element having an oxidation number of 2 is combined with oxygen anions of a peripheral carboxymethyl group or hydroxyl group.

Coating of the carboxymethyl cellulose derivative on the surface of the lithium transition metal oxide may be performed using various methods, such as dry coating, wet coating, or the like, but embodiments of the present invention are not limited thereto.

The coating of the carboxymethyl cellulose derivative on the surface of the lithium transition metal oxide may be performed in various forms. For example, partial coating, complete coating, or the like may be performed.

In addition, the coating amount of the carboxymethyl cellulose derivative may be 0.1 wt % to 10 wt % based on the total weight of the cathode active material. When the coating amount of the carboxymethyl cellulose derivative is too small, it may be difficult to achieve desired effects. On the other hand, when the coating amount of the carboxymethyl cellulose derivative is too great, conductivity may be reduced, which adversely affects battery performance.

The present invention also provides a cathode mixture for lithium secondary batteries which includes the cathode active material and a binder.

The binder, which is generally used to maintain adhesion between active material components and adhesion between an active material and a current collector, effectively alleviate stress generated during charging and discharging and absorbs volume expansion during charging and discharging, which prevents occurrence of cracks in an electrode.

In an exemplary embodiment, the binder may be a rubber-based binder synthesized by aqueous emulsion polymerization. Polymerization temperature and polymerization time may be appropriately determined according to a polymerization method, kind of a polymerization initiator used, and the like. For example, the polymerization temperature may be about 50° C. to about 200° C. and the polymerization time may be about 1 hour to about 20 hours.

Examples of an emulsifying agent used such emulsion polymerization include, but are not limited to, oleic acid, stearic acid, lauric acid, fatty acid salts such as sodium or potassium salts of mixed fatty acids, and general anionic emulsifying agents such as rosin acid.

In addition, a polymerization initiator for emulsion polymerization may be an inorganic or organic peroxide. For example, as the polymerization initiator, a water-soluble initiator such as potassium persulfate, sodium persulfate, ammonium persulfate, or the like and an oil-soluble initiator such as cumene hydroperoxide, benzoyl peroxide, or the like may be used.

In addition, to accelerate initiation reaction of peroxides, an activating agent may be further used together with the polymerization initiator. The activating agent may be at least one selected from the group consisting of sodium formaldehyde sulfoxylate, sodium ethylenediaminetetraacetate, ferrous sulfate, and dextrose.

The binder may be one selected from the group consisting of acrylonitrile rubber, butadiene rubber, and styrene-butylene rubber. The size of the binder may be appropriately adjusted in consideration of polymerization conditions, conditions as a binder for mixtures, and the like, in an emulsion polymerization process. For example, the binder may have a size of several nanometers to several micrometers.

The amount of the binder may be 1 wt % to 20 wt % based on the total weight of the cathode mixture. When the amount of the binder is too small, it may be difficult to absorb volume expansion generated during charge and discharge. On the other hand, when the amount of the binder is too great, capacity of an electrode may be reduced and resistance thereof may be increased.

The mixture may further include at least one selected from the group consisting of a dispersion, a conductive material, a viscosity modifier, a filler, a coupling agent, and an adhesion promoter, in addition to the cathode active material and the binder.

The cathode mixture including the cathode active material according to the present invention may be prepared using the following method.

First, a mixture of the cathode active material, a binder, and a conductive material is added to a dispersion, in which the amounts of the binder and conductive material are 1 wt % to 20 wt % based on the amount of the cathode active material, and the resulting dispersion is stirred to prepare a paste. Subsequently, the paste is coated on a metal plate for a current collector, compressed and dried, thereby fabricating a laminate-shaped cathode.

A cathode current collector is generally fabricated to a thickness of 3 to 500 μm. The cathode current collector is not particularly limited so long as it does not cause chemical changes in the fabricated lithium secondary battery and has high conductivity. For example, the cathode current collector may be made of stainless steel, aluminum, nickel, titanium, sintered carbon, or aluminum or stainless steel surface-treated with carbon, nickel, titanium, silver, or the like. The cathode current collector may have fine irregularities at a surface thereof to increase adhesion between the cathode active material and the cathode current collector. In addition, the cathode current collector may be used in any of various forms including films, sheets, foils, nets, porous structures, foams, and non-woven fabrics.

The conductive material is not particularly limited so long as it does not cause chemical changes in the fabricated battery and has conductivity. Examples of conductive materials include graphite such as natural or artificial graphite; carbon black such as carbon black, acetylene black, Ketjen black, channel black, furnace black, lamp black, and thermal black; conductive fibers such as carbon fibers and metallic fibers; metallic powders such as carbon fluoride powder, aluminum powder, and nickel powder; conductive whiskers such as zinc oxide and potassium titanate; conductive metal oxides such as titanium oxide; and polyphenylene derivatives.

In some cases, a filler may be selectively added as a component to inhibit cathode expansion. The filler is not particularly limited so long as it is a fibrous material that does not cause chemical changes in the fabricated battery. Examples of the filler include olefin-based polymers such as polyethylene and polypropylene; and fibrous materials such as glass fiber and carbon fiber.

The dispersion is not particularly limited. In particular, the binder used in the present invention may be dispersed in both an organic solvent and water. The dispersion may be in a liquid state at room temperature and atmospheric pressure so as to maintain the shape of polymer particles when a slurry for battery electrodes is coated on a current collector and the coated current collector is dried. Examples of the dispersion include, but are not limited to, water; alcohols such as methanol, ethanol, propanol, isopropanol, butanol, isobutanol, s-butanol, t-butanol, pentanol, isopentanol, and hexanol; ketones such as acetone, methyl ethyl ketone, methyl propyl ketone, ethyl propyl ketone, cyclopentanone, cyclohexanone, and cycloheptanone; ethers such as methyl ethyl ether, diethyl ether, dipropyl ether, diisopropyl ether, dibutyl ether, diisobutyl ether, di-n-amyl ether, diisoamyl ether, methyl propyl ether, methyl isopropyl ether, methyl butyl ether, ethyl propyl ether, ethyl isobutyl ether, ethyl n-amyl ether, ethyl isoamyl ether, and tetrahydrofuran; lactones such as gamma-butyrolactone and delta-butyrolactone; lactams such as beta-lactam; cyclic aliphatic compounds such as cyclopentane, cyclohexane, and cycloheptane; aromatic hydrocarbons such as benzene, toluene, o-xylene, m-xylene, p-xylene, ethyl benzene, propyl benzene, isopropyl benzene, butyl benzene, isobutyl benzene, and n-amyl benzene; aliphatic hydrocarbons such as heptane, octane, nonane, and decane; acyclic and cyclic amides such as dimethylformamide and N-methylpyrrolidone; esters such as methyl lactate, ethyl lactate, propyl lactate, butyl lactate, and methyl benzoate; and liquid-state materials constituting a solvent of an electrolyte, which will be described below. Two to five of the above-listed dispersions may be used in combination.

A method of uniformly coating a metal material with a paste of an electrode material may be selected from among known methods or an appropriate new method in consideration of properties and the like of materials. For example, a paste may be applied to a current collector and then uniformly dispersed thereon using a doctor blade or the like. In some cases, the application and dispersing processes may be simultaneously performed as a single process. In addition, die casting, comma coating, screen-printing, or the like may be used. In another embodiment, a paste of an electrode material may be molded on a separate substrate and adhered to a current collector by pressing or lamination. The paste coated on the metal material, e.g., a metal plate, may be dried in a vacuum oven at 50° C. to 200° C. for 1 to 3 days.

The present invention also provides a lithium secondary battery including the cathode described above.

The lithium secondary battery includes an electrode assembly in which the cathode described above faces an anode, with a separator disposed therebetween, and a lithium salt-containing non-aqueous electrolyte.

The anode may be manufactured by, for example, coating an anode active material on an anode current collector and drying the coated anode current collector. As desired, the above-described components such as a conductive material, a binder, a filler, and the like may be selectively further added to the anode active material.

The anode current collector is typically fabricated to a thickness of 3 to 500 μm. The anode current collector is not particularly limited so long as it does not cause chemical changes in the fabricated battery and has conductivity. For example, the anode current collector may be made of copper, stainless steel, aluminum, nickel, titanium, sintered carbon, copper or stainless steel surface-treated with carbon, nickel, titanium, or silver, and aluminum-cadmium alloys. As in the cathode current collector, the anode current collector may have fine irregularities at a surface thereof to enhance adhesion between the anode current collector and the anode active material. In addition, the anode current collector may be used in various forms including films, sheets, foils, nets, porous structures, foams, and non-woven fabrics.

Examples of the anode active material include, but are not limited to, carbon such as hard carbon and graphite-based carbon; metal composite oxides such as $Li_xFe_2O_3$ where $0 \leq x \leq 1$, $Li_xWO_2$ where $0 \leq x \leq 1$, $Sn_xMe_{1-x}Me'_yO_z$ where Me: Mn, Fe, Pb, or Ge; Me': Al, B, P, Si, Group I, Group II and Group III elements, or halogens; $0 < x \leq 1$; $1 \leq y \leq 3$; and $1 \leq z \leq 8$; lithium metal; lithium alloys; Si-based alloys; tin-based alloys; metal oxides such as $SnO$, $SnO_2$, $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$, and $Bi_2O_5$; conductive polymers such as polyacetylene; and Li—Co—Ni-based materials.

The anode current collector is typically fabricated to a thickness of 3 to 500 μm. The anode current collector is not particularly limited so long as it does not cause chemical changes in the fabricated battery and has high conductivity. For example, the anode current collector may be made of copper, stainless steel, aluminum, nickel, titanium, sintered carbon, copper or stainless steel surface-treated with carbon, nickel, titanium, or silver, and aluminum-cadmium alloys. As in the cathode current collector, the anode current collector may have fine irregularities at a surface thereof to enhance adhesion between the anode current collector and the anode active material. In addition, the anode current collector may be used in various forms including films, sheets, foils, nets, porous structures, foams, and non-woven fabrics.

The separator is disposed between the cathode and the anode and, as the separator, an insulating thin film having high ion permeability and mechanical strength is used. The separator typically has a pore diameter of 0.01 to 10 μm and a thickness of 5 to 300 μm. As the separator, sheets or non-woven fabrics, made of an olefin-based polymer such as polypropylene, glass fibers or polyethylene, which have chemical resistance and hydrophobicity, or kraft papers are used.

In some cases, to enhance battery stability, a gel polymer electrolyte may be coated on the separator. Examples of such gel polymers include, but are not limited to, polyethylene oxide, polyvinylidenefluoride, and polyacrylonitrile. When a solid electrolyte such as a polymer or the like is used as an electrolyte, the solid electrolyte may also serve as both the separator and electrolyte.

The lithium salt-containing non-aqueous electrolyte is composed of a non-aqueous electrolyte and a lithium salt. As the non-aqueous electrolyte, a non-aqueous organic solvent, an organic solid electrolyte, or an inorganic solid electrolyte may be used.

For example, the non-aqueous organic solvent may be an aprotic organic solvent such as N-methyl-2-pyrrolidinone, propylene carbonate, ethylene carbonate, butylene carbonate, dimethyl carbonate, diethyl carbonate, gamma-butyrolactone, 1,2-dimethoxy ethane, tetrahydrofuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, or the like.

Examples of the organic solid electrolyte include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte include nitrides, halides and sulfates of lithium (Li) such as $Li_3N$, $LiI$, $Li_5NI_2$, $Li_3N—LiI—LiOH$, $LiSiO_4$, $LiSiO_4—LiI—LiOH$, $Li_2SiS_3$, $Li_4SiO_4$, $Li_4SiO_4—LiI—LiOH$, and $Li_3PO_4—Li_2S—SiS_2$.

The lithium salt is a material that is readily soluble in the non-aqueous electrolyte. Examples thereof include $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3L_1$, $CF_3SO_3Li$, $(CF_3SO_2)_2NLi$, chloroborane lithium, lower aliphatic carboxylic acid lithium, lithium tetraphenyl borate, and imide.

In addition, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the non-aqueous electrolyte. In some cases, in order to impart incombustibility, the electrolyte may further include a halogen-containing solvent such as carbon tetrachloride and ethylene trifluoride. In addition, in order to improve high-temperature storage characteristics, the electrolyte may further include carbon dioxide gas, fluoro-ethylene carbonate (FEC), propene sultone (PRS), fluoro-propylene carbonate (FPC), or the like.

BRIEF DESCRIPTION OF THE DRAWINGS

The above and other objects, features and other advantages of the present invention will be more clearly understood from the following detailed description taken in conjunction with the accompanying drawings, in which.

MODE FOR INVENTION

Figure 1:
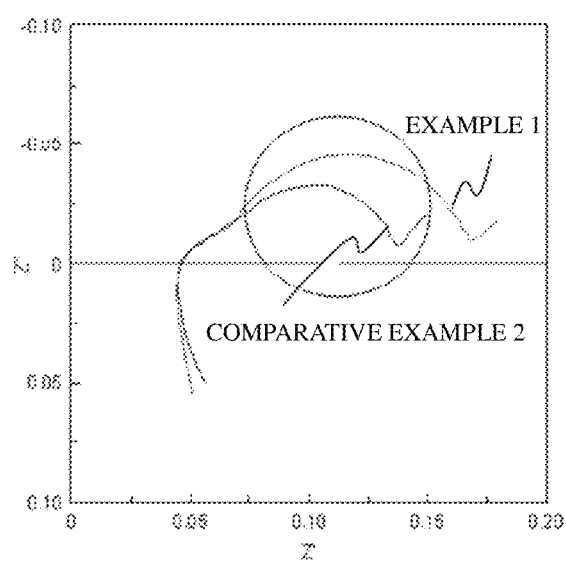
FIG. 1 is a graph showing electrochemical impedance spectra of cathodes for lithium secondary batteries fabricated according to Example 1 and Comparative Example 2, obtained according to Experimental Example 1.

Now, the present invention will be described in more detail with reference to the accompanying drawings and the following examples. These examples are only provided for illustration of the present invention and should not be construed as limiting the scope and spirit of the present invention.

Example 1

LCO as a cathode active material, carbon black as a conductive material, and a binder (Na-based CMC having a molecular weight of 1,700,000: SBR=0.5:0.8) were added to NMP in a weight ratio of 96.95:1.75:1.3 and mixed to prepare a cathode mixture. Subsequently, the cathode mixture was coated on Al foil having a thickness of 20 μm to a thickness of 200 μm and the coated Al foil was rolled and dried, thereby completing fabrication of an electrode.

The electrode is subjected to blanking into a coin shape, and the coin-shaped electrode, graphite as an anode, and a carbonate solvent containing 1 M $LiPF_6$ as an electrolyte were used to manufacture a coin-type battery.

Example 2

A lithium secondary battery was manufactured in the same manner as in Example 1, except that LCO as a cathode active material and a binder (Na-based CMC: SBR=0.7:0.8) were added in a weight ratio of 96.75:1.5.

Example 3

A lithium secondary battery was manufactured in the same manner as in Example 1, except that LCO as a cathode active material and a binder (Na-based CMC: SBR=0.7:1.0) were added in a weight ratio of 96.55:1.7.

Example 4

A lithium secondary battery was manufactured in the same manner as in Example 1, except that Na-based CMC having a molecular weight of 2,200,000 was used.

Comparative Example 1

A lithium secondary battery was manufactured in the same manner as in Example 1, except that 1.5 wt % of PVdF as a binder was added.

Comparative Example 2

A lithium secondary battery was manufactured in the same manner as in Example 1, except that 2 wt % of PVdF as a binder was added.

Comparative Example 3

A lithium secondary battery was manufactured in the same manner as in Example 1, except that Na-based CMC having a molecular weight of 300,000 was used.

Comparative Example 4

A lithium secondary battery was manufactured in the same manner as in Example 1, except that Na-based CMC having a molecular weight of 3,000,000 was used.

TABLE 1

|  | Cathode material | Conductive material | PVdF (binder) | CMC (average molecular weight) | SBR | Electrode adhesion (gf) |
|---|---|---|---|---|---|---|
| Comparative Example 1 | 96.75 | 1.75 | 1.5 | 0 | 0 | 30 |
| Comparative Example 2 | 96.25 | 1.75 | 2 | 0 | 0 | 45 |
| Comparative Example 3 | 96.95 | 1.75 | 0 | 0.5 (0.3 million) | 0.8 | 9 |
| Comparative Example 4 | 96.95 | 1.75 | 0 | 0.5 (3 million) | 0.8 | 120 |
| Example 1 | 96.95 | 1.75 | 0 | 0.5 (1.7 million) | 0.8 | 45 |
| Example 2 | 96.75 | 1.75 | 0 | 0.7 (1.7 million) | 0.8 | 50 |
| Example 3 | 96.55 | 1.75 | 0 | 0.7 (1.7 million) | 1.0 | 65 |
| Example 4 | 96.95 | 1.75 | 0 | 0.5 (2.2 million) | 0.8 | 85 |

(Amount: wt %)

Experimental Example 1

Electrochemical impedance spectroscopy was performed using each of the lithium secondary batteries manufactured according to Example 1 and Comparative Example 2.

Experimental Example 2

The lithium secondary batteries of Example 1 and Comparative Example 2 were charged to a high voltage of 4.4 V and then discharge capacities at 0.2 C and 1 C thereof were measured.

Experimental Example 3

Lifespan characteristics under high temperature and high voltage conditions were compared between the lithium secondary batteries of Example 1 and Comparative Example 2.

Experimental Example 4

Lifespan characteristics under high temperature and high voltage conditions were compared between the lithium secondary batteries of Example 1 and Comparative Example 4.

Results of Experimental Examples 1 to 4 are illustrated in FIGS. 1 to 4.

First, referring to FIG. 1, the lithium secondary battery of Example 1 in which SBR was used as a binder and surfaces of particles of the cathode active material were coated with a carboxymethyl cellulose derivative and the lithium secondary battery of Comparative Example 2 using PVdF as a binder were subjected to electrochemical impedance spectroscopy. As illustrated in FIG. 1, it can be confirmed that the lithium secondary battery of Example 1 had a higher interfacial resistance due to formation of a cathode film through coating with CMC than the lithium secondary battery of Comparative Example 2.

Figure 2:
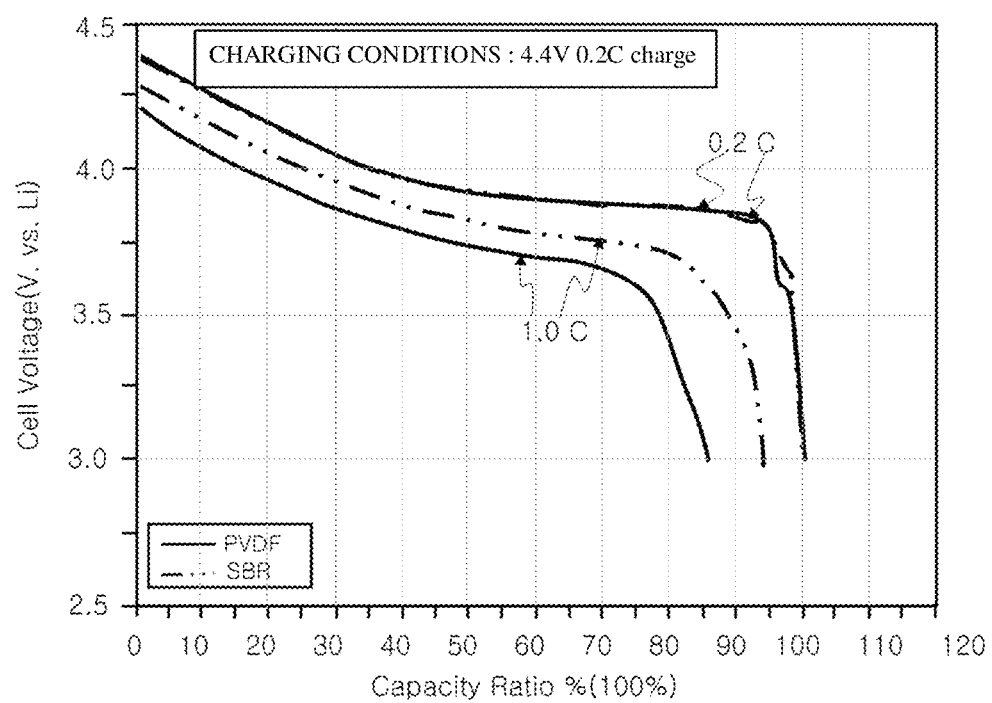
FIG. 2 is a graph showing discharge capacities at 0.2 C and 1 C of the cathodes of Example 1 and Comparative Example 2, obtained according to Experimental Example 2.

Referring to FIG. 2, it can be confirmed that the lithium secondary batteries of Example 1 and Comparative Example 2 exhibit similar performance during discharge at 0.2 C, while the lithium secondary battery of Example 1 exhibits superior performance to that of the lithium secondary battery of Comparative Example 2 in a high-rate discharging process, i.e., discharge at 1 C.

Figure 3:
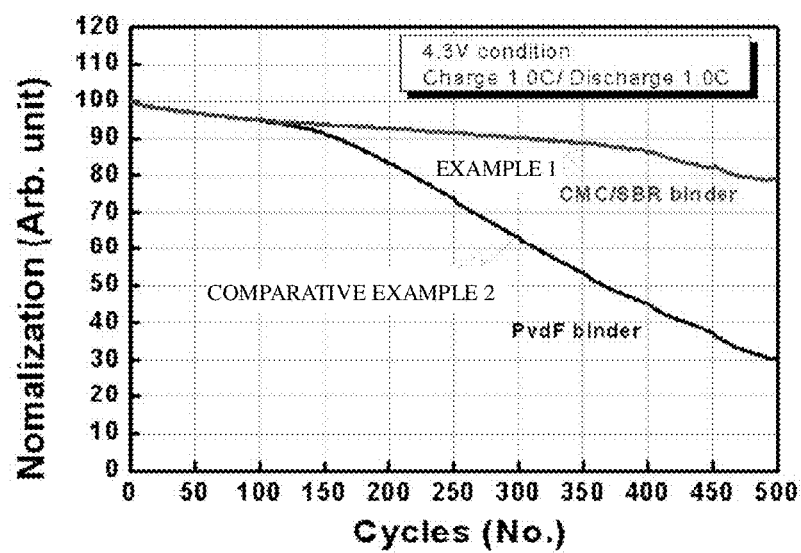
FIG. 3 is a graph showing lifespan characteristics under high temperature and high voltage conditions of rectangular-type lithium batteries manufactured using the cathodes of Example 1 and Comparative Example 2.

Referring to FIG. 3, it can be confirmed that, as charging and discharging continue, the lithium secondary battery of Comparative Example 2 using PVdF as a binder exhibits dramatically deteriorated cycle characteristics as compared to the lithium secondary battery of Example 1 in which SBR was used as a binder and surfaces of particles of the cathode active material were coated with a carboxymethyl cellulose derivative.

Figure 4:
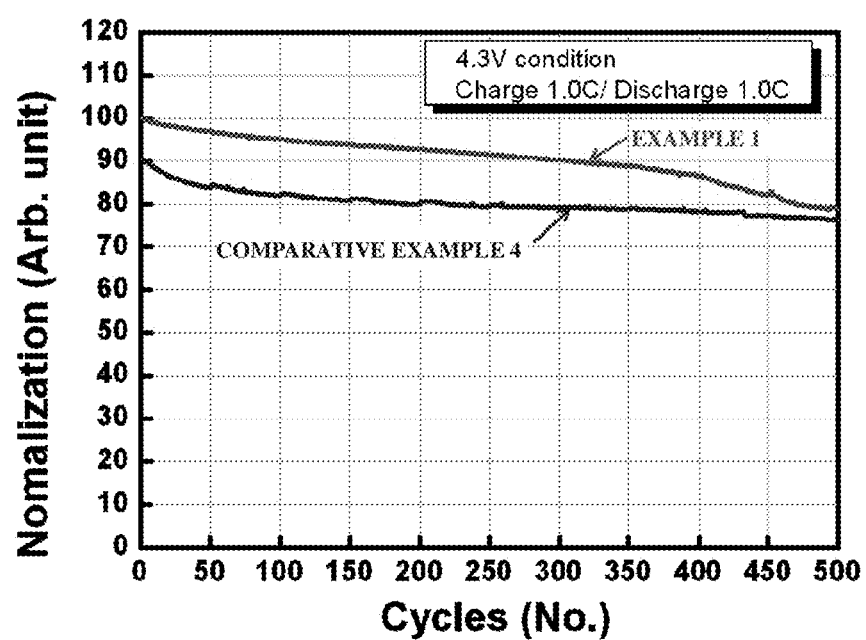
FIG. 4 is a graph showing lifespan characteristics under high temperature and high voltage conditions of rectangular-type lithium batteries manufactured using cathodes for lithium secondary batteries fabricated according to Example 1 and Comparative Example 4.

Referring to FIG. 4, it can be confirmed that the lithium secondary battery of Comparative Example 4 using CMC having a molecular weight of 3,000,000 has high electrode adhesion, while exhibiting dramatically deteriorated cycle characteristics as compared to the lithium secondary battery of Example 1 using CMC having a molecular weight of 1,700,000, as charging and discharging continue.

INDUSTRIAL APPLICABILITY

As described above, in a lithium secondary battery using a cathode active material according to the present invention, particles of which are coated with a carboxymethyl cellulose derivative, the carboxymethyl cellulose derivative serves as a thickening agent and facilitates dispersion of the cathode active material, and forms a film at a cathode surface and thus prevents elution of metals, which results in enhanced lifespan characteristics at high voltage and high temperature.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A cathode mixture for secondary batteries, comprising: a cathode active material and a binder,
wherein the cathode active material, in which a carboxymethyl cellulose derivative is coated on surfaces of particles of a lithium transition metal oxide represented by Formula 1 below:

$$Li_xM_yO_2 \quad \text{<Formula 1>}$$

wherein M is $Ni_aMn_bCo_c$ where $0 \leq a \leq 0.9$, $0 \leq b \leq 0.9$, $0 \leq c \leq 0.5$, and $0.85 \leq a+b+c \leq 1.05$); and
x+y=2, wherein $0.95 \leq x \leq 1.15$,
wherein the carboxymethyl cellulose derivative is a material represented by Formula 2 below:

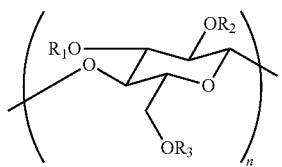

<Formula 2> wherein at least one selected from the group consisting of $R_1$, $R_2$, and $R_3$ is $CH_2CO_2X$ and the remaining group is $CH_2CO_2H$ or OH, wherein X is Na; and
n is an integer of 1 or more and is determined within a range within which the carboxymethyl cellulose derivative has a weight average molecular weight (Mw) of 1,700,000 to 2,300,000,
wherein a rate to which $R_1$, $R_2$, and $R_3$ are $CH_2CO_2X$ is 0.8 to 1.2,
wherein the binder is styrene-butadiene rubber,
wherein an amount of the binder is 1 wt % to 20 wt % based on a total weight of the cathode mixture, and
wherein a weight ratio of the carboxymethyl cellulose derivate:the styrene-butadiene rubber is 0.5:0.8 to 0.7:1.0.

2. The cathode mixture according to claim 1, wherein, in Formula 1, amounts of Ni, Mn and Co satisfy the conditions: $0.2 \leq a \leq 0.7$, $0 < b \leq 0.5$, and $0 < c \leq 0.5$.

3. The cathode mixture according to claim 1, wherein M is substituted with at least one element selected from the group consisting of Al, Mg, Fe, Ti, V, Zr, Sn, and Zn.

4. The cathode mixture according to claim 1, wherein a coating amount of the carboxymethyl cellulose derivative is in a range of 0.1 wt % to 10 wt % based on a total weight of the cathode active material.

5. The cathode mixture according to claim 1, further comprising at least one material selected from the group consisting of a dispersion medium, a conductive material, a viscosity modifier, a filler, a coupling agent, and an adhesion promoter.

6. A cathode for secondary batteries, in which the cathode mixture according to claim 1 is coated on a current collector.

7. A lithium secondary battery comprising the cathode according to claim 6.

* * * * *